United States Patent [19]
Leichsenring et al.

[11] 3,897,089
[45] July 29, 1975

[54] DEVICE FOR THE RELEASABLE CONNECTION OF A DUAL HOSE SYSTEM TO A CLOSED CONTAINER

[75] Inventors: Carl Hans Leichsenring, Graben-Neudorf; Gustav Kunz, Bruchsal, both of Germany

[73] Assignee: Gesellschaft fur Kernforschung m.b.H., Karlsruhe, Germany

[22] Filed: Dec. 5, 1973

[21] Appl. No.: 421,995

[30] Foreign Application Priority Data
Dec. 5, 1972 Germany............................ 2259429

[52] U.S. Cl. .................. 285/158; 277/61; 285/174; 285/316; 285/352; 403/288
[51] Int. Cl............................................... F16l 39/02
[58] Field of Search .......... 285/316, 315, 352, 161, 285/158, 174; 403/288, 325, 197; 277/61, 167.3

[56] References Cited
UNITED STATES PATENTS
3,342,510  9/1967  Walters.......................... 285/352 X
3,525,541  8/1970  Snyder........................... 285/316 X
3,537,478  11/1970 Evans............................. 285/316 X Primary Examiner—Thomas F. Callaghan
Attorney, Agent, or Firm—Spencer & Kaye

[57] ABSTRACT

A plug for use with a coupling for the releasable connection of a dual hose to a closed container, the coupling being composed of two parts meeting along a separating plane, with one part being connected to the outer hose and the other part being connected to the container, and the plug also being composed of two parts arranged to meet along the separating plane, with each part of the plug being composed of two tubular parts and an annular seal disposed between the parts in such a manner that relative movement between the two tubular parts causes the associated seal to be axially compressed and radially expanded against the wall of the passage through the coupling. The plug also includes elements for so moving the parts of each plug half and for detachably connecting the plug halves and urging the plug halves together to cause the two seals to form an axial joint.

4 Claims, 4 Drawing Figures

DEVICE FOR THE RELEASABLE CONNECTION OF A DUAL HOSE SYSTEM TO A CLOSED CONTAINER

BACKGROUND OF THE INVENTION

The present invention relates to a coupling for the releasable connection of a dual hose system, the hoses lying one inside the other, to a closed containment member, particularly of the type in which the coupling includes releasable coupling parts with a free passage for the inner hose, part of the coupling parts being fastened to the outer hose and another part being fastened to the containment member.

Such couplings are required for use with radioactive materials in conjunction with the so-called α technique. α and β particle radiators, for example plutonium, must be handled according to this α technique. The term "α technique" is a well-known term and refers to a technique which has long been known in the art. The principle of the α technique involves establishing an absolutely gastight containment around all α and β radiators. For extremely dangerous materials such as plutonium, a double-walled containment is necessary. All manipulations for handling the radiator must also be transmitted into the containment in a gastight manner. The shielding factor of the containment is only a secondary significance because of the short range of α and β radiators.

A significant feature of the α technique is the maintenance of a dual shield, i.e., a dual safety sheath between the α particle radiator and the operating personnel. Such dual sheaths are formed by sealed instruments which are placed into further sealed boxes. Connections are therefore required between such boxes, via which radioactive liquids, gases or the like can be transported from box to box. The connections consist of double hoses, i.e., a hose system composed of an inner hose inside and an outer hose.

SUMMARY OF THE INVENTION

It is an object of the present invention to permit such a double hose to be simply coupled to or decoupled from a box or other instrument.

Another object of the invention is to provide a coupling which is safe and which is particularly suited for handling plutonium or transuranium solutions in such a manner that the danger of contamination of the environment is substantially eliminated.

These and other objects are achieved according to the invention by providing, for a coupling of the above-mentioned type, a two-part plug which can be pushed into the free passage of the coupling from the interior of the container, the two parts of the plug being divided along dividing surfaces lying in the separating plane between the coupling parts. Two soft annular seals whose axial end faces are pressed together are placed between the outside of the plug and the inside of the free passage and the plug can be divided into two halves from the container side along the plane between the two soft seals. The seals are each radially expandable by means of axial forces emanating from tongues attached to the contact surfaces of the two plug sleeves and radially extending therefrom in the form of oblique bearing surfaces. With such a configuration, the entire coupling, including the outer portion and the plug, can be divided into two halves, the two plug halves sealing the open sides of the outer hose or of the outer coupling attached thereto even if this outer coupling is separated.

A preferred embodiment of the present invention further includes a pressure spring arranged between a sleeve supporting the seal and a spring sheath, forming one plug half, for producing the radial sealing force in the one seal, and a screw bolt arranged between a threaded adapter sleeve and the guide sleeve, forming the other plug half, for producing the radial sealing force for the other seal by simply twisting a sleeve nut on this bolt. This bolt makes it possible to produce sealing forces in the radial as well as axial direction from the interior of the container by simply rotating the bolt or a sleeve nut, respectively, at the two interiorly disposed seals.

The axial sealing force is produced, according to the present invention, in that the bolt is screwed into the spring sleeve by means of a threaded portion on the bolt, and a further pressure spring is disposed between the bolt and the threaded adapter sleeve, which thus can produce an axial sealing force between the frontal faces of the seals. This sealing force is released when the threaded portion of the bolt is screwed into the threaded adapter sleeve, i.e., into another threaded portion, so that the axial sealing pressure is removed from between the two seals and it becomes possible to separate the parts of the closing plug into two elements.

DESCRIPTION OF THE PREFERRED EMBODIMENTS

Figure 1:
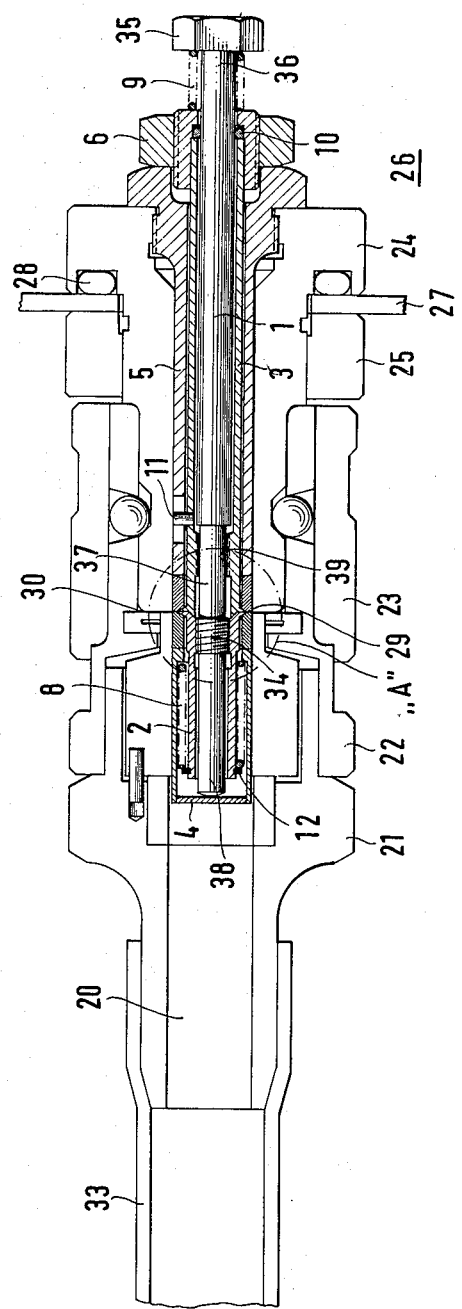
FIG. 1 is a cross-sectional view of an arrangement according to the invention, showing a closed coupling with a closing plug inserted.

FIG. 1 shows the coupling for an outer hose of the type described above, as well as a plug built thereinto. The outer hose 33 of the dual hose system is fastened to the walls 27 of a containment area 26 by means of outer coupling parts including an outer flange 21, a locking part 22, a displaceable sleeve 23, an inner flange 24, and a nut 25 threadedly engaging flange 24. Inner flange 24 is provided with a groove receiving a seal 28 for sealing the joint between flange 24 and the inner surface of wall 27. The locking part 22 is screwed onto the outer flange 21. Between flange 21 and sleeve 4 there is interposed an element (which is not numbered but is cross-hatched in FIGS. 2, 3 and 4), which can be made of rubber and which provides a buffer, or cushioning, action.

Elements 21, 22 and 23 constitute the hose attachment part of the coupling, while elements 24 and 25 constitute the container attachment. These two parts join together along a separating plane 30 and are held together by balls held in part 22 and a detente in flange 24. To uncouple the parts, sleever 23 is slid toward the hose to free the balls from the detente.

The above-mentioned coupling parts 21 to 25 have a central, free passage 20 which extends through the entire coupling from the outer hose 33 to the interior 26 of the container.

FIG. 1 shows a multiple part plug inserted into the free passage 20 from the interior of container 26. A portion of this assembly is shown in greater detail in FIG. 4. This plug substantially includes two members, or groups of parts, the inner group being composed of a spring sleeve 2, an enclosing sleeve 4, a compression spring 8 disposed therebetween, and a rubber seal 7a which is attached to the spring sleeve 2 in the region adjacent the end of sleeve 4. The outer part of the plug is formed by a threaded adapter sleeve 3, a guide sleeve 5, a sleeve nut 6 and a rubber seal 7b. The guide sleeve 5 surrounds the threaded adapter sleeve 3 and seal 7b is attached to this threaded adapter sleeve 3 in a manner similar to the attachment of seal 7a to sleeve 2.

The sleeve nut 6 is screwed to the threaded adapter sleeve 3 and is supported at a collar of the guide sleeve 5 so that rotation of the sleeve nut 6 moves the threaded adapter sleeve 3 and the guide sleeve 5 relative to one another. More specifically, nut 6 is composed of an inner part which is welded to the outer end of adapter sleeve 3 and an outer part which can be rotated to move sleeve 3, the inner and outer parts being in threaded engagement with one another.

The two plug groups 2, 4, 8, 7a and 3, 5, 6, 7b are connected together by an intermediate member formed by threaded bolt 1. The threaded bolt 1 has a hexagonal head 35 at its outer end which is followed by a cylindrical part 36. This is followed by the cylindrical portion 37 of smaller diameter than part 36, as well as threaded portion 34 and end portion 38. In the position illustrated in FIGS. 1 and 2 the threaded portion 34 is screwed into the spring sleeve 2. Between the hexagonal head 35 of the threaded bolt 1 and the inner frontal face of the threaded adapter sleeve 3 there is disposed a compression spring 9 which presses the threaded adapter sleeve 3 and the spring sleeve 2 against one another when the threaded portion 34 engages sleeve 2. The cam 16 and groove 17, respectively, provided in the frontal faces of parts 2 and 3 permit releasable protection against rotation. The two seals 7a and 7b are thus also pressed against one another at their facing axial faces by the action of the compression spring 9 so that a linearly sealed slit is produced at the dividing surface 29 of the plug. The seals 7a and 7b are preferably made of a fluorine-containing rubber, while the metal part of the coupling can be made from various materials. In preferred embodiments of the invention the coupling can have the form of a housing made of stainless steel.

The plug consisting of the above-described parts is installed in the outer coupling in such a manner that this parting surface 29 of the plug comes to lie precisely in the separating plane 30 between the outer coupling parts 21 and 24. In this position the rubber seals 7a and 7b are disposed between the outer surfaces of the inner plug portions 2 and 3, respectively, and the inner surface of the free passage 20 of the outer coupling parts.

The screw bolt 1 thus serves to connect and hold all individual parts of the closing plug when the complete plug is screwed into the closed coupling. If the bolt 1 is now released, the compression spring 8, which slides on spring sleeve 2 and is thus held by spring ring 12 at the end of sleeve 2, compresses the rubber seal 7a via sleeve 4. This compression is supported by tongue 18 which is attached to the frontal face of the spring sleeve 2. Tongue 18 presents an oblique, conical, surface sloping outwardly away from the body of sleeve 2 and dimensioned to bear against a radially inner portion of the end surface of seal 7a. The radial deformation of rubber seal 7a seals the movable coupling half and simultaneously clamps tight the inner plug part.

The guide sleeve 5 of the outer plug part is screwed into the inner flange 24 of the outer coupling. In this guide sleeve 5, which is secured against rotation relative to sleeve 3 by a pin 11 inserted into a groove, the threaded adapter sleeve 3 slides with the rubber seal 7b bearing at its inner end. By tightening the sleeve nut 6 the seal 7b is compressed by tongue 19 against the adapter sleeve 3 in the same manner as the seal 7a provided on the other side, so that the fixed coupling half formed of the inner flange 24 and nut 25 is closed. An O-ring 10 serves as a seal between the threaded bolt 1 and sleeve 3.

Figure 3:
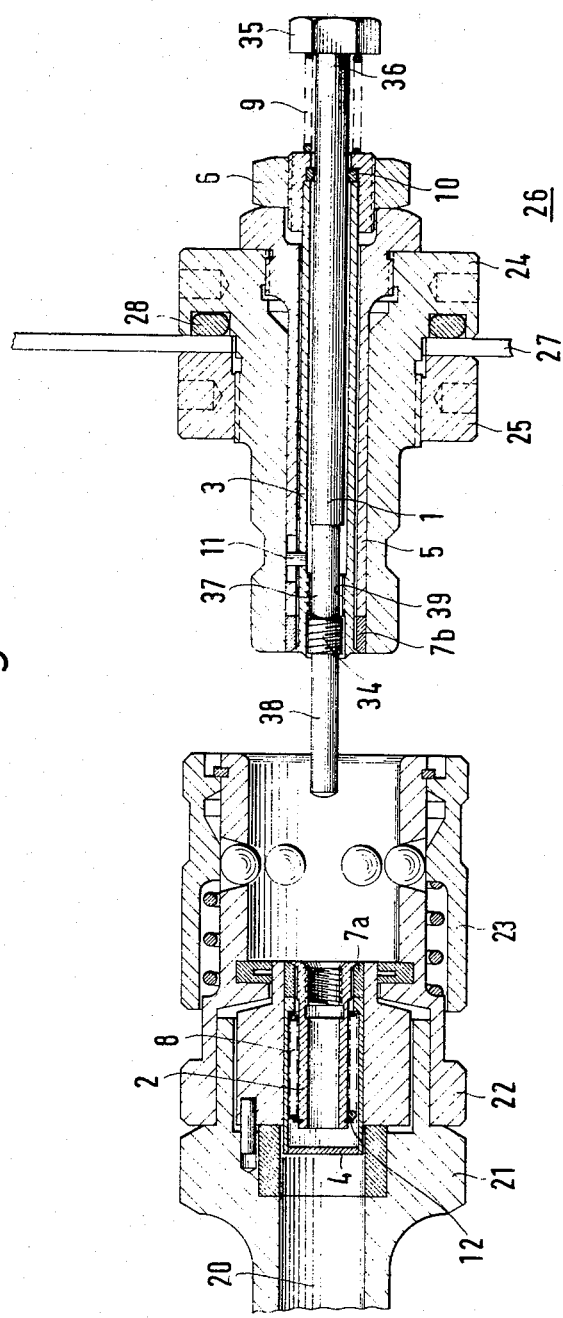
FIG. 3 is a cross-sectional view showing two components of the arrangement of FIG. 1 in a separated state.
Figure 4:
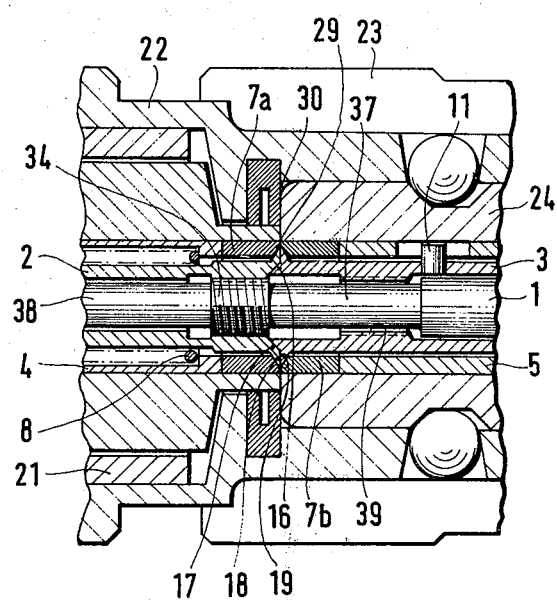
FIG. 4 is a cross-sectional view, to an enlarged scale, of the portion A of FIG. 1.

The separation of the entire plug is effected by turning the hexagonal head 35 so that the threaded portion 34 of screw bolt 1 is screwed out of the thread in the spring sleeve 2 and is screwed into the thread 39 in the threaded adapter sleeve 3. This enables the compression spring 8 to become effective, i.e., the cylindrical end piece 38 of screw bolt 1 moves out of sleeve 4 and permits sleeve 4 to be pressed by spring 8 to compress and radially expand seal 7a so that sleeve 4 is clamped tight in the free passage 20. Then the outer coupling can be separated, for which purpose the plug is also separated into two halves, seal 7a holding the inner plug portion in the free passage 20 and seal 7b holding the outer part of the plug in the portion of this free passage defined by element 24 in a sealing manner. This separated state is shown in FIG. 3.

Figure 2:
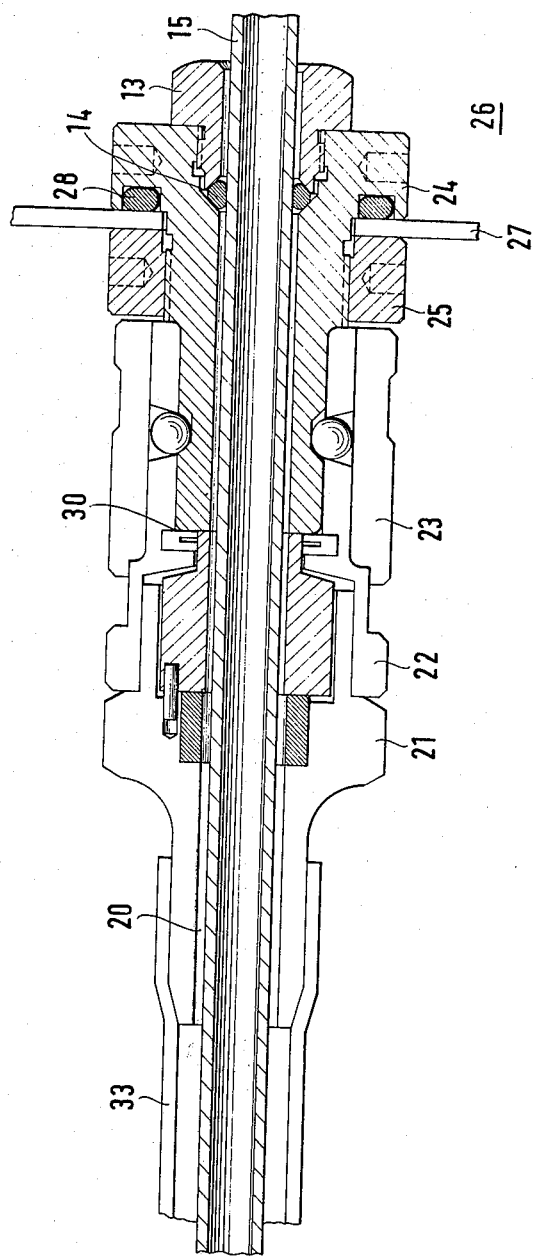
FIG. 2 is a cross-sectional view of the closed coupling of FIG. 1 with the closing plug removed and with a media hose as the inner containment member of the dual hose system introduced through the free passage of the coupling.

If the plug is in the state shown in FIG. 1, i.e., seals 7a and 7b are radially relaxed and compressed only axially at their frontal faces, the plug can be completely removed and screwed out by screwing the guide sleeve 5 out of the inner flange 24 of the outer coupling. Thus the free passage 20 is open from the outer hose 33 to the interior of the container 26. In this state the inner hose, i.e., the media hose 15, can be inserted into the coupling, as shown in FIG. 2. This media hose 15 connects two instruments which are accommodated in separate boxes and is inserted in the protective hose, which is the outer hose 33. By means of the pressure screw coupler 13, the rubber sealing ring 14 is compressed between the media hose 15 and the free passage 20 of the coupling so that the air gap between this media hose 15 and the interior of the coupling is sealed tight.

The operational steps for operating the coupling are summarized briefly as follows:

1. The pressure screw 13 is unscrewed and removed.
2. The media hose 15 is pulled out of the free passage 20.
3. The plug is screwed into the inner flange 24.
4. The inner seal 7a is clamped by backing the screw bolt 1 off, via its hexagonal head 35.
5. Seal 7b is clamped by screwing the sleeve nut 6 on the threaded adapter 3.
6. The screw bolt 1 is further unscrewed until the threaded portion 34 is screwed into the thread 39 of threaded adapter sleeve 3.
7. The outer coupling is separated by displacing the displaceable sleeve 23 so that the detente balls holding the outer coupling can move outward and release the outer coupling.

8. The outer hose 33 is coupled off from the containment area 26 and the free passage 20 is sealed at the hose as well as at the container.

The special advantage of the present invention is that when substances are handled which have a high α activity, the danger of contamination of the environment during transport of these substances from or between α-tight boxes is reduced to a minimum. The present invention here permits, in an advantageous manner, the safe conveyance of solutions of such susbstances in hoses and permits clean decoupling of such hose connections. With the system according to the present invention, including a double hose and a rapid coupling and a plug, a very safe system is provided for handling transuranium solutions while utilizing very simple and generally available components, such as hoses and couplings.

It will be understood that the above description of the present invention is susceptible to various modifications, changes and adaptations, and the same are intended to be comprehended within the meaning and range of equivalents of the appended claims.

We claim:

1. For use with a coupling for the releasable connection of a dual hose, composed of an inner hose inside an outer hose, to a closed container, the coupling defining an axially extending passage for such inner hose and being composed of an inner coupling part fastened to the outer hose of the dual hose system and an outer coupling part detachably connected to the inner part and fastened to the closed container, the two parts being connected together to meet along a separating plane, a two-part plug arranged to be inserted into the passage defined by the coupling in the direction from the container, said plug being composed of an inner part and an outer part, said inner and outer parts being separable from one another and meeting along a separating plane coincident with the separating plane of the coupling when said plug is fully inserted into the coupling, each said part of said plug comprising two members which are axially movable relative to one another and an annular seal of a resiliently deformable material, said seal having a pair of opposed axial end surfaces, each bearing against a respective one of said members, and an external circumferential surface arranged to face the surface of the coupling which defines the axially extending passage, with the end of one of said members and the associated end of said seal being arranged to lie on said separating plane when said plug is fully inserted and that portion of said one member against which the associated end surface of said seal bears having the form of an oblique surface sloping radially outwardly relative to the body of said seal, whereby relative movement of said two parts in a direction to move said axial end surfaces of said seal toward one another causes said seal to deform radially outwardly to form a sealing connection with the surface of the coupling which defines the axially extending passage.

2. An arrangement as defined in claim 1 wherein: said inner part of said plug further comprises a spring mounted between said two members of said inner part for urging said members in such direction relative to one another, thereby to move said axial end surface of said seal associated with said inner plug part toward one another, said two members of said outer plug part are constituted by an externally threaded adapter sleeve, constituting said one of said members, and a guide sleeve enclosing said adapter sleeve and having a collar at its end remote from said separating plane; and said plug further comprises a sleeve nut threadedly engaging said adapter sleeve and arranged to bear against said collar, whereby rotation of said nut relative to said adapter sleeve causes said sleeves to move relative to one another to cause the axial end surfaces of said seal associated with said outer plug part to move toward one another.

3. An arrangement as defined in claim 2 wherein said one of said members of said inner part of said plug is constituted by a spring sleeve provided with an internally threaded portion, and said plug further comprises: a bolt arranged to extend through said adapter sleeve and said spring sleeve and provided with a head and an externally threaded portion engageable with said threaded portion of said spring sleeve; and a spring mounted between said bolt head and said adapter sleeve for urging said adapter sleeve toward said spring sleeve, and thus urging said seals of said two plug parts together to produce an axial seal therebetween, when said threaded portions of said bolt and said spring sleeve are in engagement.

4. An arrangement as defined in claim 3 wherein said adapter sleeve is provided with an internally threaded portion into which said threaded portion of said bolt can be screwed for permitting separation of said two plug halves from one another.

* * * * *